W. ROGERS.
COMBINATION HOOK AND LOCK.
APPLICATION FILED SEPT. 24, 1913.

1,120,542.

Patented Dec. 8, 1914.

Witnesses

Inventor
W. Rogers,
By Victor J. Evans
Attorney

UNITED STATES PATENT OFFICE.

WILLIAM ROGERS, OF NEW BEDFORD, MASSACHUSETTS.

COMBINATION HOOK AND LOCK.

1,120,542.	Specification of Letters Patent.	Patented Dec. 8, 1914.

Application filed September 24, 1913. Serial No. 791,580.

*To all whom it may concern:*

Be it known that I, WILLIAM ROGERS, a citizen of the United States, residing at New Bedford, in the county of Bristol and State of Massachusetts, have invented new and useful Improvements in Combination Hooks and Locks, of which the following is a specification.

This invention relates to an improved combination hook and lock, and it has for its object to produce a supporting hook for general use embodying a guard arm and a lock, whereby the guard arm may be secured in obstructing position with respect to the hook for the purpose of preventing unauthorized removal of articles supported on the hook.

A further object of the invention is to produce a device of the class described in connection with supporting means such as screws, whereby the hook may be mounted in position, the arrangement being such that the securing means may not be detached when the device is locked, thereby preventing the bodily removal of the hook.

A further object of the invention is to construct a device of the class described with a guard arm which is of curved or arcuate form so as to constitute an auxiliary hook on which objects will be supported without being secured by the locking device.

With these and other ends in view which will readily appear as the nature of the invention is better understood, the same consists in the improved construction, combination and arrangement of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

Figure 1:
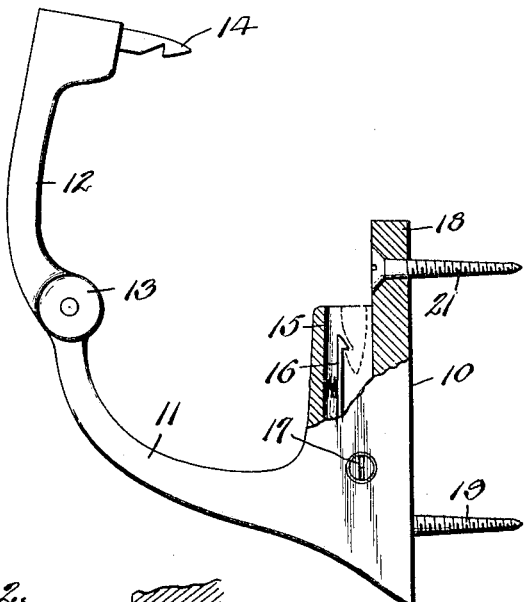
Figure 2:
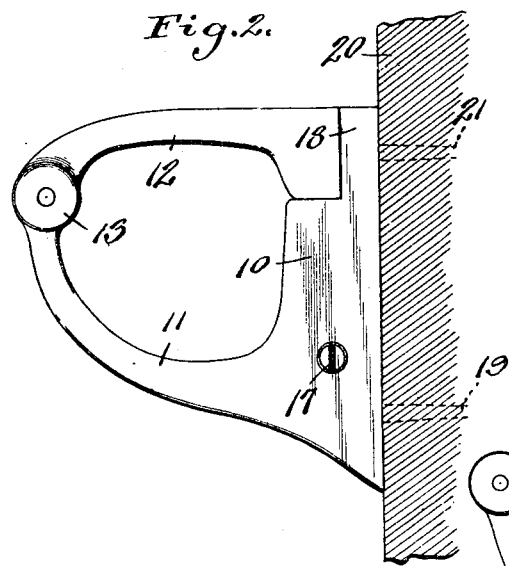
Figure 3:
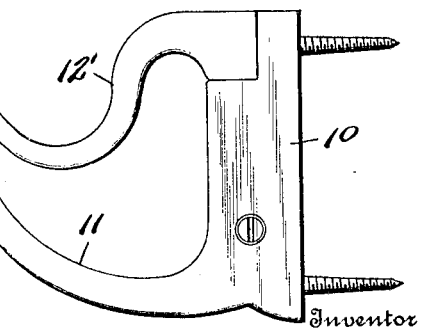

In the drawing,—Figure 1 is a side view, partly in section, of the device with the guard arm swung to a non-obstructing position. Fig. 2 is a similar view of the device, showing the guard arm locked. Fig. 3 is a similar view showing a modification, whereby the guard arm forms an auxiliary hook.

Corresponding parts in the several figures are denoted by like characters of reference.

A base 10 of suitable design and dimensions is provided with a forwardly extending hook member 11 with the forward end of which a guard arm 12 is connected by a pivot member 13. The guard arm 12 has at its free end a catch 14 for the reception of which the base is provided with a socket 15, said socket containing also a locking device of conventional construction including a spring actuated latch member 16 adapted for engagement with the catch 14 and which may be actuated to release it from the catch by means of a key of suitable construction for the admission of which a keyhole 17 is provided. The base 10 includes an upwardly extending lip 18 which projects above the socket portion and which is positioned in rear of the free extremity of the arm 12 when the latter is in locked position.

The base member 10 is provided near its lower end with a fastening member, such as a wood screw 19 which is integrally connected therewith and which extends rearwardly with respect to the base. This device may be screwed into the wall or other supporting member, indicated at 20. The second fastening member consisting of an ordinary wood screw 21 is inserted into the supporting member 20 through the lip 18. It will be readily seen that when the arm 12 is in locked or obstructed position, it will obstruct access to the head of the screw 21, thus preventing the removal of said screw. It is also evident that as long as the screw 21 is in position, it is impossible to rotate the device about the axis of the screw 19 which would be necessary in order to disengage the latter from the support. The device will, therefore, be held securely against unauthorized removal when the arm 12 is locked in obstructing position.

The improved hook may be used for the purpose of supporting garments of various kinds, harness and many other articles, which, by securing the arm 12 in obstructing position will be kept and safe-guarded against unauthorized removal. By disengaging the latch member 16 from the catch 14 by the use of a suitable key, the arm 12 may be swung to a non-obstructing position, as will be readily seen.

Under the construction shown in Fig. 3 of the drawings, the arm, here designated by 12', has been bent or curved to form an auxiliary hook on which additional articles may be supported after the arm has been placed in an obstructing position with respect to the hook 11. Such auxiliary hook may be found useful, for instance, for the purpose of supporting a hat when other garments are supported on the hook 11, it being obviously impossible to place a hat on the hook 11 and then to place the arm 12 in obstructing position. Other uses for the auxiliary hook formed by the arm 12 will readily suggest themselves.

It will be seen that I have produced a simple and efficient safety hook and locking device which not only will prevent the unauthorized removal of garments and the like supported on the hook, but will also safeguard the removal of the hook itself from the wall or other support on which it may be mounted.

Having thus described the invention, what is claimed as new, is:—

A device of the class described comprising a base having a socket and a lip extending upwardly adjacent thereto, a fastening screw connected integrally with the base near the lower end therefrom, a hook extending forwardly from the base, a guard arm pivotally connected with the hook and having a catch at the free end thereof and adapted to engage the socket, a fastening screw extending through the lip of the base and obstructed by the guard arm when the catch of the latter engages the socket, and a locking device in the socket including a spring actuated latch engaging the catch.

In testimony whereof I affix my signature in presence of two witnesses.

WILLIAM ROGERS.

Witnesses:
ANTONE J. FREITAR,
MANUEL A. PEDROZO.

Copies of this patent may be obtained for five cents each, by addressing the "Commissioner of Patents, Washington, D. C."